United States Patent [19]

Welsh, Jr.

[11] 4,005,639

[45] Feb. 1, 1977

[54] BACKING PLATE MEANS FOR A SERVOMOTOR

[75] Inventor: Harold H. Welsh, Jr., South Bend, Ind.

[73] Assignee: The Bendix Corporation, South Bend, Ind.

[22] Filed: June 6, 1975

[21] Appl. No.: 584,309

[52] U.S. Cl. .............................. 91/376 R; 60/533; 91/369 A; 92/99

[51] Int. Cl.² .......................................... F15B 9/10

[58] Field of Search ........ 60/533; 91/376 R, 369 R, 91/369 A; 92/99, 100

[56] References Cited

UNITED STATES PATENTS

| | | | |
|---|---|---|---|
| 2,380,983 | 8/1945 | Mock | 92/100 X |
| 2,720,564 | 10/1955 | Soreng et al. | 92/99 X |
| 2,977,935 | 4/1961 | Randol | 91/376 X |
| 3,023,785 | 3/1962 | Russell | 92/99 |
| 3,143,927 | 8/1964 | French et al. | 91/376 |
| 3,688,647 | 9/1972 | Kytta | 91/369 A |
| 3,724,211 | 4/1973 | Julow | 60/533 X |

*Primary Examiner*—Martin P. Schwadron
*Assistant Examiner*—Abraham Hershkovitz
*Attorney, Agent, or Firm*—Leo H. McCormick, Jr.; William N. Antonis

[57] ABSTRACT

A servomotor having a metal backing plate for a diaphragm which separates the interior of a front shell and a rear shell into a front chamber and rear chamber. The metal backing plate is attached to a hub which extends through the rear shell. The hub has an axial bore with a first passageway which is connected to the front chamber and a second passageway which is connected to the rear chamber. A control means is retained in the axial bore by the metal backing plate being attached to the hub. When the control means is actuated, fluid under pressure enters the rear chamber and creates a pressure differential. The pressure differential develops a force across the diaphragm which is directly transmitted through the backing plate to an output push rod.

10 Claims, 4 Drawing Figures

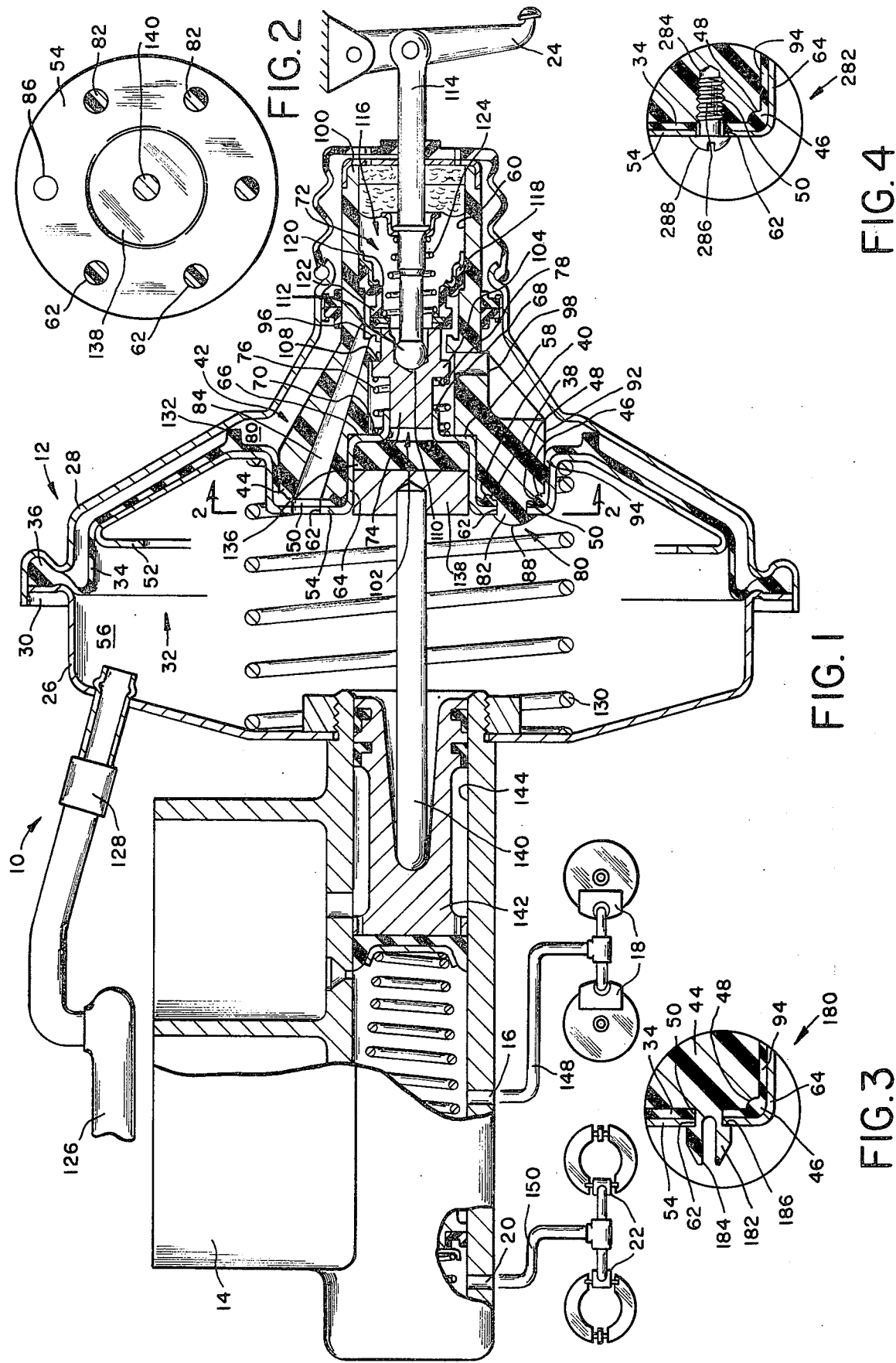

BACKING PLATE MEANS FOR A SERVOMOTOR

BACKGROUND OF THE INVENTION

Many attempts have been made in an attempt to simplify differential pressure servomotors. In U.S. Pat. No. 3,106,873 a one piece plastic backing plate and hub was introduced to reduce the number of parts required to manufacture such pressure differential servomotors. A pressure differential developed across a diaphragm acts on the plastic backing plate to transmit an output force to a push rod retained in an axial bore in the hub. After an extended period of time of maximum operation, it has been possible to produce a fracture of the plastic in the area of a passageway adjacent a reaction means associated with the push rod through which the output force is transmitted. The fracture has been determined to be caused by fatigue in the plastic resulting from repeated internal stressing primarily caused by the radial forces produced by the reaction means.

Another attempt at simplification of pressure differential servomotor is disclosed in U.S. Pat. No. 3,754,450 wherein a plastic hub member is attached to a metal backing plate. In this design, in addition to the passageway, a slot is provided for the insertion of a lug which holds the control valve in the hub. However, after repeated maximum development of the operational pressure differential this hub has also shown small fractures even though additional supporting ribs were added in the passageway area.

SUMMARY OF THE INVENTION

I have devised a servomotor having a backing plate means and associated the diaphragm means which are fixed to a plastic hub means. The output force developed by a pressure differential is directly transmitted to an output push rod through the backing plate means without passing through a plastic hub means.

The plastic hub has an axial bore therein with a first passageway which extends on an angle to a end face and a second passageway which extends vertically through the cylindrical body of the hub. An annular shoulder is located on the cylindrical body in the axial bore between the first passageway and the second passageway. The end face of the hub has a first groove and a second groove thereon. The backing plate means and the diaphragm means each have a plurality of holes concentric to a rib and peripheral bead on the diaphragm means. A fastening means extends through all of the plurality of holes except one hole which is aligned with the first passageway. The fastening means engages the end face of the hub means to locate the rib and peripheral bead of the diaphragm in the first and second grooves in the hub means and sealingly separate the front chamber from the rear chamber. A plunger of the control means has a rib on a cylindrical section which is urged toward the annular shoulder by a first resilient means attached to an inward projection on the backing plate means. A push rod attached to the plunger has a second resilient means attached thereto for urging a poppet valve toward the plunger and the annular shoulder. The push rod responds to an input force to move the plunger in the axial bore and initially allow the second resilient means to seat on the annular shoulder and interrupt the communication of vacuum from the front chamber through the first passageway into the axial bore. Further movement of the plunger allows air to enter the rear chamber from the axial bore through the second passageway to create pressure differential across the diaphragm and backing plate means. This pressure differential acts on the backing plate to directly transmit an output force through a reaction disc to a push rod connected to the master cylinder. Upon termination of the input force, the first resilient means initially moves the plunger into engagement with the poppet valve to terminate the communication of air to the rear chamber. Thereafter the resilient means moves the plunger away from the annular shoulder to allow vacuum to evacuate air from the rear chamber and dissipate the pressure differential to terminate the output force acting on the output push rod.

It is therefore the object of this invention to provide means for permitting the transmission of an operational output force of a servomotor directly through a backing plate means into the output transmitting means.

It is another object of this invention to provide a servomotor with a backing plate means having a first annular groove into which a valve retaining hub means compresses a diaphragm to sealingly separate a front chamber from a rear chamber and a second annular groove into which a reaction means is retained by an output push rod.

It is another object of this invention to provide a servomotor with a backing plate means which is attached to a hub by a series of fasteners to sandwich a diaphragm means therebetween and sealingly separate a front chamber from a rear chamber.

It is still a further object of this invention to provide a servomotor with a backing plate means having an inner section which is fixed to a hub means by a series of pins to retain a plunger within an axial bore in the hub means.

These and other objects of this invention will become apparent from reading this specification and viewing the drawings.

BRIEF DESCRIPTION OF THE DRAWINGS

FIG. 1 is a sectional view of a servomotor in a braking system having a backing plate means attached to a hub means by a series of fastener means to sealingly separate a front chamber from a rear chamber.

FIG. 2 is a sectional view taken along lines 2—2 in FIG. 1.

FIG. 3 is another embodiment of a fastener means for joining the backing plate means to the hub means.

FIG. 4 is another embodiment of a fastener means for joining the backing plate means to the hub means.

DETAILED DESCRIPTION OF THE PREFERRED EMBODIMENT

The braking system 10 shown in FIG. 1 has a pressure differentially operated servomotor 12 connected to a master cylinder 14. The master cylinder 14 has a first outlet port 16 connected to the front wheel brakes 18 and a second outlet port 20 connected to the rear wheel brakes 22. An operator transmits an operational input through brake pedal 24 to actuate the servomotor 12 and provide a braking force for the vehicle.

In more particular detail, the servomotor 12 has a front shell 26 joined to a rear shell 28 by a twist lock connection 30. A wall means 32 has a diaphragm 34 with a peripheral bead 36 retained between the front shell 26 and the rear shell 28 by the twist lock connection 30 and an inner bead 38 located in a first groove 40 on the end face 44 of the hub means 42. The diaphragm 34 has a rib 46 and concentric to the inner bead 40 which is located in a second groove 48 in the end face 44 of the hub means 42. The diaphragm has a series of holes 50 located between the rib 46 and the inner bead 38. A backing plate means 52 is located in front of the diaphragm 34. The backing plate means 52 has a first cylindrical projection 54 which extends into the front chamber 56 and a second cylindrical section 58 which extends into the axial bore 60 of the hub means 42. The first cylindrical section 54 has a series of holes 62 (see FIG. 2) located on the same radii as the holes 50 in the diaphragm 34. The second cylindrical section 58 has a first annular section 64 which abuts a shoulder 66 on the hub means 42 and a second annular section 68 which is separated from the first annular section 64 by a convergent section 70.

The second annular section 68 provides a bearing surface for the plunger 74 of the control valve means 72, and a guide surface for spring 76 which is caged between the convergent section 70 and shoulder 78 on the plunger 74. Fastener means 80 as shown in FIGS. 1 and 2 includes pins 82 which extend through holes 50 in the diaphragm 34 and holes 62 in the backing plate means 52 to align hole 86 with passageway 84 in the hub means 42. Head 88, in the embodiment in FIG. 1, is formed by riveting the end of pin 82. For example, when the hub means 42 is made of plastic, a hot iron is attached to the rivet to melt the same into a head, and when the hub means 42 is made of aluminum, a compressive force is used to make a head.

The head 88 acts on the first cylindrical section 54 to hold the rib 46 in groove 48 and inner bead 38 in groove 40 to sealingly separate the front chamber 56 from the rear chamber 90. As the end face 44 of the hub means 42 is drawn into the cylindrical section 54, peripheral surface 92 radially urges cylindrical or tubular section 94 of the diaphragm into the backing plate means 52 to radially provide a seal between the front chamber 56 and the rear chamber 90.

An annular shoulder 96 is located in the axial bore 60 between the outlet of the passageway 84 and a second passageway 98 in the cylindrical projection 100. The annular shoulder 96 will limit the rearward movement of the plunger 74 by spring or resilient means 76.

The plunger means 74 which is part of the valve control means 72 has a first cylindrical section 102 which slides on guide and bearing 68, a second cylindrical section 104 which intersects with the first cylindrical section to form shoulder 78 and a third cylindrical section 106 which intersects with the second cylindrical section 104 to form shoulder 108. Shoulder 108 engages the annular shoulder 96 on the hub to stop the rearward movement of the plunger 74 by the spring 76. The third cylindrical section 108 has an axial depression or bore 110 located therein for retention of the sperical end 112 of the push rod 114.

A poppet valve means 116 located in the axial bore 60 has an end 118 fixed to the cylindrical projection 100, a flexible section 120 and a face 122. A spring 124 attached to the push rod 114 urges face 122 toward the end of the third cylindrical section 106 to prevent air at atmospheric pressure from entering into the rear chamber 90 through passageway 98.

MODE OF OPERATION OF THE PREFERRED EMBODIMENT

With the vehicle operating, vacuum which is produced at the intake manifold 126 evacuates air from the front chamber 56 of the servomotor 12 through conduit 128. Any air present in the rear chamber 90 flows through passageway 98 into the axial bore 60 and out the passageway 84 into the front chamber 56 to equalize the pressure across the wall means 32. With equalized pressure in both the front chamber 56 and the rear chamber 90, return spring 130 which surrounds the first cylindrical projection 54 of the backing plate means 52 moves the wall means 32 toward the rear chamber 90 until bumper 132 engages the rear shell 28.

When the operator desires to brake the vehicle, an input force is applied to the brake pedal 24 which moves the plunger 74 through push rod 114. Initial movement of the plunger allows spring or resilient means 124 to seat face 122 on the annular shoulder or vacuum seat 96 to interrupt the communication of vacuum between the front chamber 56 and the rear chamber 90 through passageway 84. Further movement of the plunger 74 in opposition to spring 76 moves the end of the third cylindrical section 106 away from face 122 to allow air to enter into the rear chamber through passageway 98. With air in the rear chamber 90 and vacuum in the front chamber 56, a pressure differential is created across the wall means 32. This pressure differential acts on the surface area of the diaphragm 34 and backing plate means 52 to produce an output force. This output force is directly carried through the backing plate means 52 through the second cylindrical section 58 into the reaction disc 136 for distribution to the head 138 of the output push rod 140. This pressure differential causes the wall means 32 to move toward the front chamber 56 and correspondingly move the output push rod 140 to move piston 142 in bore 144 of the master cylinder 14. As piston 142 moves in bore 114 a hydraulic pressure is developed for distribution through conduits 148 and 150 to operate the front 18 and rear 22 brakes, respectively. As the operational output force is developed by the pressure differential, the reaction disc 136 is compressed and acts against the first diameter or cylindrical section 102 of the plunger 74 to provide the operator with an indication of the intensity of the output force being produced. However, since the reaction disc 136 is confined in the cylindrical section 64 of the backing plate means 54, the hub means 42 does not absorb any internal stresses which could cause a failure thereof.

Upon termination of the input force on pedal 24, return spring 76 moves the end of the third cylindrical section 106 into contact with face 122 to interrupt communication of air into the rear chamber through passageway 98. Further movement of the plunger by the return spring moves the face 122 away from shoulder 96 to allow the air in the rear chamber 90 to be evacuated through passageway 84. When the air is evacuated from the rear chamber 90, return spring 130 again urges the wall 32 toward the rear chamber 90 until bumper 132 engages the rear shell.

The fastener means 180 shown in FIG. 3 could equally be utilized in the embodiment of FIG. 1 to hold the backing plate means 32 rigidly against the face 44 of the hub means 42. Fastener means 180 has a pair of arms 182 and 184 which extends from the annular body of the hub means 44. A locking notch 186 is cut into the arms 182 and 184. Arms 182 and 184 are pinched together to allow the diaphragm 34 and backing plate means 52 to be positioned adjacent the face 44 of the hub means 42. When the diaphragm 34 contacts the face 44, arms 182 and 184 are released and locking notch 186 engages the backing plate means 52 to secure the wall means 32 together as a unit.

In the embodiment of the fastener means 282 shown in FIG. 4, the face 44 of the hub means 42 has a series with holes 50 and 62 in the diaphragm 34 and the backing plate means 52. A screw which has a continuous helical rib 286 and a cylindrical shank 288 are inserted in the hole 284. The screw draws the backing plate means 52 and diaphragm 34 tight against the face 44 on the hub to form a sealed surface which separates the front chamber 56 from the rear chamber 90.

It should be noted that all the holes in the backing plate means 52, the diaphragm 34, and passageway 74 are all the same size. This allows for ease in assembly, to assure that the flow path from the front chamber 56 to the rear chamber 90 through passageway 84, always has the same area.

I claim:

1. A servomotor for use in a vehicle, comprising:
   a housing having a front shell and a rear shell, said front shell and said rear shell being joined together to form a sealed cavity therein;
   diaphragm means having an external bead located between the front shell and the rear shell for establishing a front chamber and a rear chamber, said diaphragm means having an inner bead separated from an annular rib, said diaphragm means having a sleeve section which extends rearwardly from said annular rib, said diaphragm means having a series of holes located between said annular rib and said inner bead;
   hub means having a first groove and a second groove, said first groove being associated with said annular rib and said second groove being associated with said inner bead, said hub means having an axial bore therethrough, said axial bore being connected to at least one of said series of holes in said diaphragm means through a passageway means;
   backing plate means located adjacent said diaphragm means having a second series of holes therein aligned with said first series of holes in the diaphragm means, said backing plate means having an inner surface which extends into said axial bore of the hub means, said hub means urging said sleeve section against said backing plate means to radially seal the rear chamber from the front chamber;
   fastener means connecting said backing plate means to said hub means through some of said first and second series of holes for urging said annular rib and inner bead of diaphragm means into said first and second grooves, respectively, to sealingly separate the front chamber from the rear chamber; and
   control means located in said axial bore of the hub means for allowing free communication between the front chamber and the rear chamber by way of communication through the axial bore through said passageway means, said control means responding to an input force to interrupt communication between the axial bore and the front chamber through said passageway means for allowing a source of fluid under pressure to enter the rear chamber and establish a pressure differential across the diaphragm means and backing plate means and create an output force which is directly transmitted through said inner surface of said backing plate means into an output means.

2. The servomotor, as recited in claim 1 wherein said control means includes:
   poppet means aligned in said axial bore through engagement with the inner surface of said backing plate means for regulating the development of said pressure differential.

3. The servomotor, as recited in claim 1, wherein said hub means further includes:
   an annular shoulder located adjacent said passageway, said control means being seated on said shoulder to interrupt the communication between the front chamber and the axial bore.

4. The servomotor, as recited in claim 3, wherein said inner surface of said backing plate means includes:
   a first annular section concentric to and extending along said axial bore in the hub means; and
   a second annular section concentric to said first annular section and separated therefrom by a convergent section.

5. The servomotor, as recited in claim 4, wherein said control means includes:
   plunger means located in said axial bore having a first cylindrical section, a second cylindrical section and a third cylindrical section, said first cylindrical section being located in said second annular section of the backing plate means, said second cylindrical section being adapted to engage said annular shoulder to limit the rearward movement of the plunger means in said axial bore, said third cylindrical section having an axial depression located therein.

6. The servomotor, as recited in claim 5, wherein said control means further includes:
   poppet means having an end section fixed to said axial bore, a flexible section and a face section, said poppet means being adapted to engage said third cylindrical section to allow said free communication between the front chamber and said rear chamber and to engage said annular shoulder to prevent communication from said passageway into the axial bore.

7. The servomotor, as recited in claim 6, wherein said control means further includes:
   push rod means having a spherical head which is retained in said axial depression in the third cylindrical section of the plunger means.

8. The servomotor, as recited in claim 6, wherein said control means further includes:
   first resilient means located between said convergent section of said backing plate means and the second cylindrical section of the plunger means for urging said push rod means to a rest position; and
   second resilient means attached to said push rod means for urging said face section of the poppet means into engagement with the third cylindrical section of the plunger means during said free communication between the front chamber and the rear chamber and into engagement with said annular shoulder during the communication of the fluid under pressure to the rear chamber.

9. The servomotor, as recited in claim 8, wherein said fastener means includes:
   pin means extending from said hub means for aligning said first and second series of holes with said passageway to allow said free communication from the front chamber through the passageway into the axial bore of the hub means; and head means attached to said pin means for retaining said diaphragm means and said backing plate means against the hub means.

10. The servomotor, as recited in claim 8, wherein said fastener means includes:

screw means having a continuous helical rib which extends from a cylindrical shank, said helical rib extending through said first and second series of holes and engaging said hub means to hold said cylindrical shank against the backing plate means and compress the diaphragm means between the backing plate means and the hub means to achieve said seal between the front chamber and the rear chamber.

* * * * *